United States Patent [19]
Krukoski et al.

[11] Patent Number: 4,773,213
[45] Date of Patent: Sep. 27, 1988

[54] ENGINE CONTROL WITH SMOOTH TRANSITION TO SYNTHESIZED PARAMETER

[75] Inventors: Leon Krukoski, Coventry; Richard F. Laprad, South Windsor, both of Conn.

[73] Assignee: United Technologies Corporation, Hartford, Conn.

[21] Appl. No.: 939,215

[22] Filed: Dec. 8, 1986

[51] Int. Cl.$^4$ .............................................. F02C 9/00
[52] U.S. Cl. ................................. 60/39.03; 60/39.281
[58] Field of Search ............... 60/39.281, 39.03, 39.06, 60/39.24, 39.282

[56] References Cited

U.S. PATENT DOCUMENTS

| | | | |
|---|---|---|---|
| 2,809,492 | 10/1957 | Arkawy | 60/39.28 |
| 3,420,056 | 1/1969 | Eames | 60/39.28 |
| 4,058,975 | 11/1977 | Gilbert et al. | 60/39.28 |
| 4,122,667 | 10/1978 | Hosaka et al. | 60/39.09 |
| 4,212,161 | 7/1980 | Newirth et al. | 60/39.28 |
| 4,212,161 | 7/1980 | Newirth et al. | 60/39.28 |
| 4,228,650 | 10/1980 | Camp | 60/39.281 |
| 4,249,238 | 2/1981 | Spang et al. | 364/106 |
| 4,423,594 | 1/1984 | Ellis | 60/39.281 |
| 4,543,782 | 10/1985 | Fitzmaurice | 60/39.281 |
| 4,581,888 | 4/1986 | Schmitzer et al. | 60/39.09 |
| 4,594,849 | 6/1986 | Kenison et al. | 60/39.29 |
| 4,651,518 | 3/1987 | McLaughlin et al. | 60/39.02 |

*Primary Examiner*—Louis J. Casaregola
*Attorney, Agent, or Firm*—Stephen E. Revis

[57] ABSTRACT

A gas turbine engine control system operates based upon a synthesized value of a parameter upon loss of the actual measured value of the parameter. To provide smooth engine operation upon switchover to the synthesized parameter a fixed trim is applied to the synthesized parameter which, upon switchover, makes the synthesized parameter equal to the last known measured value of the parameter. Thus, the engine will see no sudden change in operation at the instant of switchover. Thereafter the trimmed synthesized parameter changes in value by the same amount as does the untrimmed synthesized parameter.

5 Claims, 2 Drawing Sheets

ENGINE CONTROL WITH SMOOTH TRANSITION TO SYNTHESIZED PARAMETER

CROSS REFERENCE TO RELATED APPLICATIONS

Commonly owned U.S. Ser. No. 939,217 entitled *Fuel Control with Smooth Mode Transition* by Leon Krukoski et al., filed on even date with the present application, discloses and claims subject matter related to the subject matter of the present application.

DESCRIPTION

1. Technical Field

This invention relates to engine controls for gas turbine engines.

2. Background Art

Fuel controls for gas turbine engines operate in a closed loop fashion based on an engine parameter, such as engine pressure ratio (EPR) which is the ratio of the engine exhaust to engine inlet total pressure $P_5/P_2$. A desired or reference EPR is computed based upon throttle setting and prevailing atmospheric conditions and is compared to the actual EPR of the engine; fuel is modulated to drive the resultant error term to zero. A detected failure of any one of the signals necessary to compute either the reference EPR or the actual EPR forces operation of the control based upon an alternate control mode, such as the speed $N_1$ of the low compressor if the engine is a twin spool gas turbine engine. In that case, a reference $N_1$ ($N_{1ref}$) is computed based upon prevailing conditions and throttle setting. This is compared to the actual $N_1$ and fuel is modulated to drive the resultant error term to zero. Because the characteristics of these different references are different, there could be a sudden change in engine speed at the time of transfer. This is sometimes referred to as a "bump". Bumps, at a minimum, can be unsettling to the pilot and passengers of the aircraft. Furthermore, if they occur during transient engine operation they can be dangerous, such as when the pilot suddenly calls for full power, and the engine does not respond in the manner expected.

In the PW2037 twin spool engine manufactured by the Pratt & Whitney Division of United Technologies Corporation, it is known to eliminate bumps when a control mode change occurs by attempting to force the new reference parameter to match the failed reference parameter at the instant of failure. More specifically, if EPR is the primary mode and $N_1$ is the backup mode, it is known to continuously monitor $N_1$ during EPR operation and to use the last value thereof prior to EPR failure to trim the reference speed schedule such that $N_{1ref}$ (trimmed) equals the last measured value of $N_1$ at the instant of EPR failure. If the desired $N_1$ just after EPR failure (i.e. trimmed $N_{1ref}$) is almost the same as $N_1$ just before the failure, the bump is virtually eliminated. This will be the case when EPR fails during steady state engine operation or at low rates of acceleration or deceleration; however, if EPR failure occurs near the onset of a significant engine transient the bump will not be eliminated as a result of the great difference between the engine speed at the time of EPR failure and the desired engine speed ($N_{1ref}$) based upon the new throttle setting at the time of EPR failure. The fault logic will therefore overcompensate and the result may be a severe loss of engine thrust.

DISCLOSURE OF THE INVENTION

One object of the present invention is an engine control for a gas turbine engine which can transfer from operation based upon a first engine parameter to operation based on a different engine parameter with minimum effect on engine operation at the time of switchover.

Another object of the present invention is a fuel control for a gas turbine engine which switches from operating as a function of the actual value of one parameter to operating as a function of a synthesized value of that parameter with minimal effect on engine operation at the time of switchover.

According to the present invention, a gas turbine engine control system regulates the engine as a function of the actual value of one parameter and switches to operating as a function of a synthesized value of that parameter upon loss of a reliable actual value, using, as the initial synthesized value of the parameter at the time of switchover, the actual value of the parameter last measured before loss, and thereafter incrementally changing that initial value by the same amount the synthesized value of the parameter changes.

Upon loss of the actual value of the parameter, and thereafter, this invention effectively applies a constant value trim to the synthesized value of the parameter. The magnitude of the trim is an amount which makes the synthesized value at the instant of switchover equal to the last good measured value of the parameter. Thus, at the instant of switchover, although the control input suddenly becomes a synthesized value of the parameter, the value of that input is unchanged from the last measured value of the parameter, and the engine will not experience any sudden change or "bump" in its operation.

In a preferred embodiment the synthesized parameter is compressor speed, but the present invention may be used to eliminate bumps in engine operation caused by switching from actual to synthesized values of any parameter.

The foregoing and other objects, features and advantages of the present invention will become more apparent in the light of the following detailed description of preferred embodiments thereof as illustrated in the accompanying drawing.

BEST MODE FOR CARRYING OUT THE INVENTION

Figure 1:
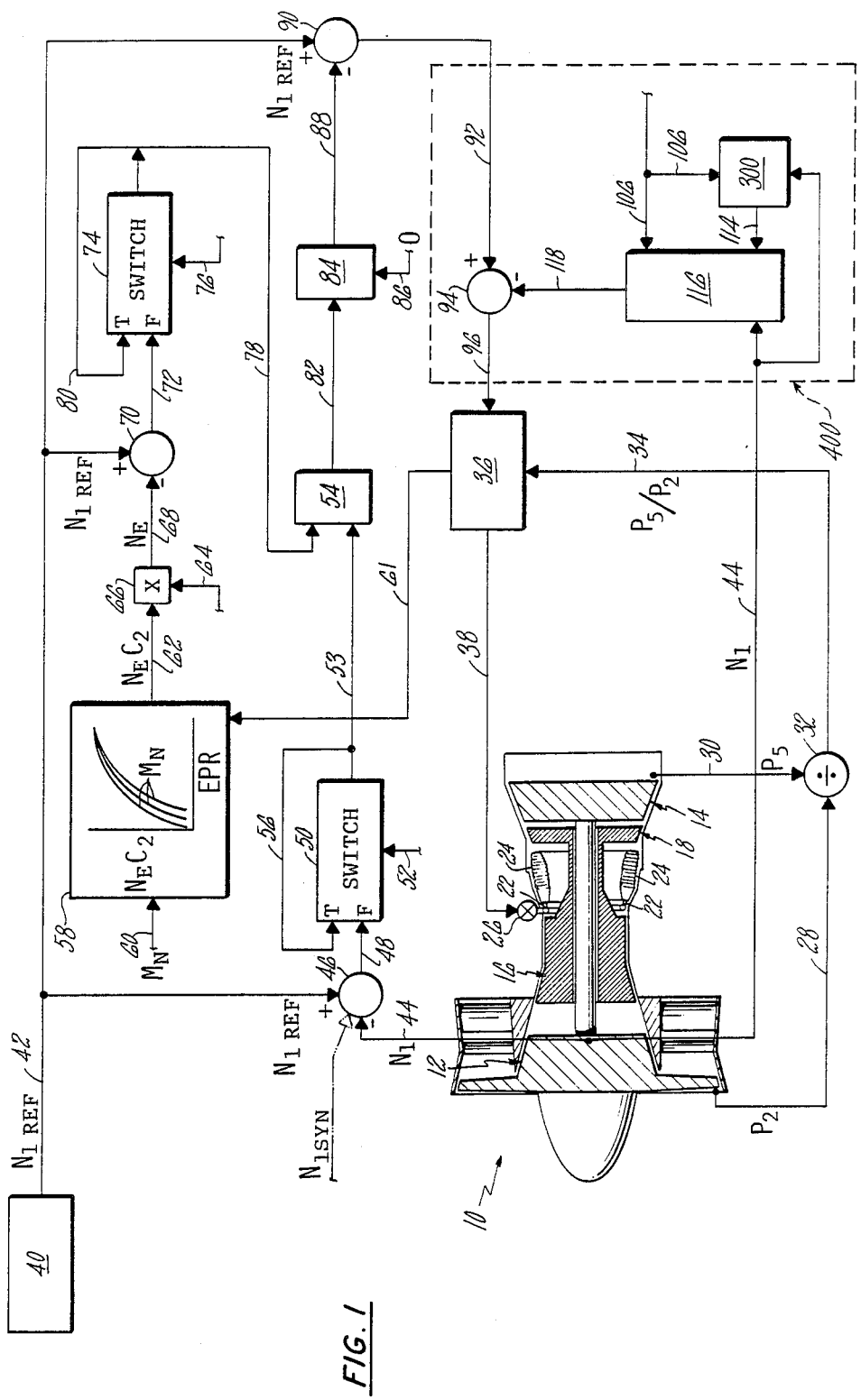
FIG. 1 is a schematic and block diagram of a twin spool gas turbine engine incorporating the control system of the present invention.

As an exemplary embodiment of the present invention, consider the twin spool turbofan gas turbine engine shown in the drawing and generally represented by the reference numeral 10. The engine comprises a low compressor 12 connected through a shaft to a low turbine 14; a high compressor 16 connected through a shaft to a high turbine 18; and a burner section 20 disposed between the high compressor and the high turbine. A plurality of fuel nozzles 22 spray fuel into the burners 24 of the burner section 20. Fuel flow rate into the nozzles 22 is varied by a valve 26.

An electronic engine control automatically regulates engine operation, such as fuel flow rate, based upon pilot demand (throttle setting), various aircraft and engine parameters and scientific and empirically developed relationships between various parameters. In this embodiment the electronic engine control's primary mode of fuel flow control is based upon engine total pressure ratio (EPR), which is the ratio of the engine outlet pressure ($P_5$) to the engine inlet pressure ($P_2$). As shown in the drawing, a signal 28 indicative of the inlet pressure and a signal 30 indicative of the outlet pressure are delivered to a divider 32. The output signal 34 from the divider is the engine pressure ratio, which signal is delivered to a portion of the fuel control designated by the box 36. Within the control portion 36 is a schedule of engine pressure ratios against which the actual pressure ratio is compared. The control portion 36 sends a signal 38 to the fuel nozzle valve 26 to adjust the fuel flow, and thereby the engine speed, until the actual engine pressure ratio matches the scheduled engine pressure ratio for the particular throttle setting.

If either the primary fuel control parameter, engine pressure ratio, or the engine pressure ratio schedules become unavailable or unreliable (hereinafter either occurrence is referred to as an EPR mode failure), the control portion 36 switches to a secondary parameter, low pressure compressor speed $N_1$, to control the fuel flow. With reference to the drawing, a control portion 40 continuously produces an output signal 42 indicative of a scheduled low compressor reference speed $N_{1ref}$. This reference speed is the maximum speed that the engine can tolerate under existing conditions and throttle setting. A signal 44 indicative of the actual low pressure compressor speed $N_1$ is subtracted from $N_{1ref}$ in a subtractor 46; and a signal 48 indicative of that difference is delivered to a switch 50. Of course, while the engine is still being controlled based upon EPR, $N_1$ will be a value which is a function of EPR in accordance with the EPR schedule built into the control.

A signal 52 is delivered to the switch 50 when an EPR mode failure occurs. When no signal 52 is present the output 53 of the switch 50 is the presently calculated value of the signal 48, which is sent to a select-low gate 54. When the switch 50 receives the signal 52, its output 53 is a signal 56 which is indicative of the value of the signal 48 last calculated prior to the switch receiving the signal 52; and that value of the signal 48 is thereafter continuously delivered to the select low gate 54.

A function generator 58 continuously receives a signal 60 indicative of the aircraft Mach number $M_n$ and a signal 61 from the control portion 36 indicative of the scheduled engine pressure ratio. Based upon these inputs the function generator 58 generates a signal 62 ($N_E C_2$) indicative of the low pressure compressor speed corrected to the temperature at the low compressor inlet. In a manner well known in the art, the corrected low pressure compressor speed 62 and an appropriate multiplier 64 (a function of temperature at the low pressure compressor inlet) are delivered into a multiplier 66 to yield a signal 68 indicative of an estimated value of the low rotor speed ($N_E$). The estimated low pressure compressor speed signal 68 is subtracted from $N_{1ref}$ in a subtractor 70 and a signal 72 indicative of that difference is delivered to a switch 74.

A signal 76 is delivered to a switch 74 when an EPR mode failure occurs. When there is no signal 76 the switch 74 passes the presently calculated value of the signal 72. Upon receiving the signal 76 the output 78 of the switch 74 has the value of a signal 80 which is indicative of the value of the signal 72 last calculated prior to the switch 74 receiving the signal 76. The value of the signal 78 therefore represents the difference between $N_{1ref}$ and an estimated low pressure compressor speed based upon an engine pressure ratio schedule and the current engine throttle setting, and not based upon the current low rotor speed $N_1$. Thus, if the engine pressure ratio or engine pressure ratio schedules become unavailable or unreliable immediately after the throttle has been moved and before the engine has had an opportunity to change from its old speed to its new speed, the signal 68, which is the estimated compressor speed $N_E$, will be approximately the speed normally called for by the engine pressure ratio schedule at the new throttle setting. In contrast, the speed signal 44 will be the actual engine speed at the time of EPR mode failure, which may be considerably different from the desired speed based upon the throttle setting and the EPR schedule.

The speed difference signals 78 and 53 are both fed to the select-low gate 54, and the lower of the two signals, represented by the output signal 82, is passed to a select-high gate 84. The high gate 84 receives the signal 82 as well as a signal 86. The signal 86 is always zero. Thus, if the signal 82 is negative, the output signal 88 from the high gate 84 will be zero; otherwise it will be identical to the signal 82. The high gate 84 is used to assure that the value of the signal 88 (the $N_{1ref}$ trim) is never negative, which could happen when the EPR mode failure occurs during a deceleration. A negative value for the signal 88 would result in a value of the signal 92 which is higher than $N_{1ref}$, which cannot be allowed since $N_{1ref}$ is the maximum low compressor speed which the engine can safely tolerate. Thus, only a down-trim is applied to $N_{1ref}$.

The value of the signal 88 is subtracted from $N_{1ref}$ in a subtractor 90, and a signal 92 indicative of the difference is delivered to a subtractor 94 along with a signal 118 from a switch 116. The signal 118 will have the value of either the current actual engine low pressure compressor speed signal 44 or, if the signal 44 ($N_1$) is unavailable or unreliable, will have a synthesized value of $N_1$. An error signal 96 indicative of the difference between the actual or synthesized engine speed and the desired engine speed represented by the signal 92 is delivered into the control portion 36. When either the engine pressure ratio signal 34 or the EPR schedules within the control portion 36 is unavailable or unreliable the control portion 36 controls the fuel flow via the valve 26 to reduce the error signal 96 to zero.

To avoid a "bump" during steady state it is necessary that the trim limiting mechanism of the control system not influence the trim operation when EPR mode failure occurs during steady state engine operation. This will be assured if the value of the signal 68 is always less than the value of the compressor speed which would have been called for by the throttle setting in the EPR mode. The Mach number curves used in the function generator 58 are therefor selected to assure that $N_E$ will never be greater than and will preferably be slightly less than the speed called for by the EPR schedule at the time of EPR failure.

Although the primary parameter in this embodiment is the engine pressure ratio, it is apparent the same technique may be used with a primary parameter other than EPR (e.g. fan pressure ratio or a weighted fan/engine pressure ratio).

Figure 2:
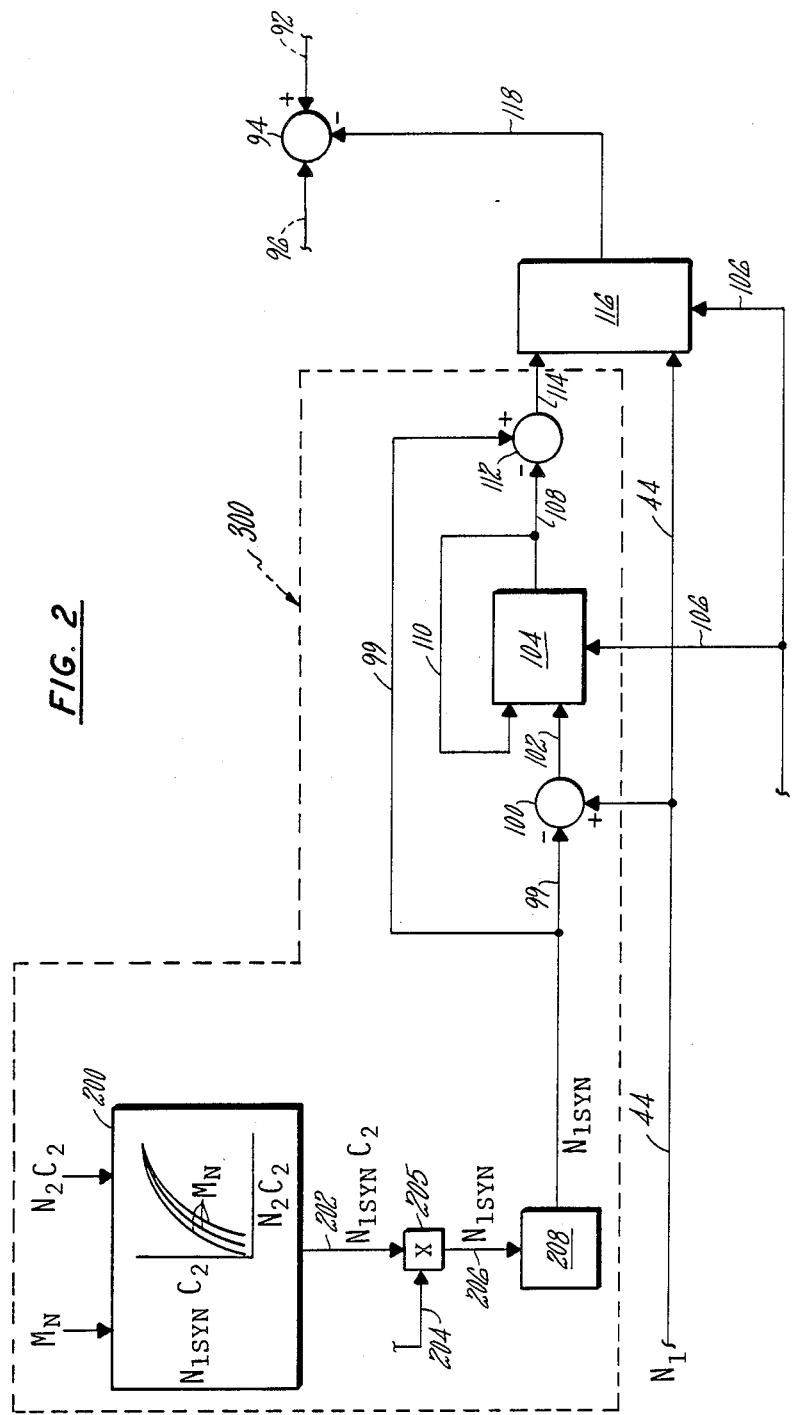
FIG. 2 is a schematic and block diagram showing the control system of the present invention.

In the event of failure of certain parameters required by a control system to operate an engine it is known to calculate a synthesized value of the failed parameter to be used in place of the actual measured parameter. For example, burner pressure is synthesized in commonly owned U.S. Pat. No. 4,212,161 to David M. Newirth et al. In accordance with the present invention it is desireable to calculate a synthesized value of $N_1$ (hereinafter referred to as $N_{1syn}$) to be used in the event of unavailability or unreliability of an actual measured value of $N_1$. In such event, this synthesized value of $N_1$ would be used in the substractor 46 in place of the $N_1$ signal 44. This is represented by the phantom line labeled $N_{1syn}$ in FIG. 1. A synthesized value of $N_1$ would also be used to determine the input to the subtractor 94. $N_{1syn}$ is calculated in this synthesis calculator 300, shown in detail in FIG. 2. FIG. 2 shows the control portion of FIG. 1 encompassed by the phantom line 400.

As with the sudden switchover to a different control mode, the switch from an actual to a synthesized parameter can result in a "bump". The control logic of FIG. 2 shows a technique for eliminating such a bump. A synthesized value of $N_1$ is continuously calculated from the most recent, valid information such that it is always up to date and ready for use upon the actual value of $N_1$ becoming unavailable or unreliable (i.e., $N_1$ failure). Referring to the drawing, aircraft Mach number and the high compressor speed corrected to the temperature at the low compressor inlet ($N_2C_2$) are input to a function generator 200. The function generator 200 produces an output 202 which is an estimated value of the low compressor speed corrected to the temperature at the low compressor inlet ($N_{1syn}C_2$). The value of the signal 202 is based upon empirically derived relationships between Mach number and corrected high compressor speed which, in turn, are based upon steady state engine characteristics.

In a manner well known in the art, the corrected, estimated corrected pressure compressor speed 202 and an appropriate multiplier 204 (which would be the same as the multiplier 64 of FIG. 1) are delivered into a multiplier 205 to yield a signal 206 indicative of an estimated or synthesized value of the low rotor speed ($N_{1syn}$). Since the value of $N_{1syn}$ is based upon empirical relationships between the high and low rotor during steady state engine operation, the signal 206 is passed through a compensator 208 which replaces the dynamic characteristics of the corrected high pressure compressor speed $N_2C_2$ with that of the output $N_{1syn}C_2$ during transient operation. During steady state operation the compensator will have no effect. Compensators of this nature are well known in the art.

The $N_{1syn}$ output signal 99 from the compensator 208, along with the signal 44 indicative of the actual measured value of $N_1$ are continuously fed to a subtractor 100. A signal 102 representing the difference between them is fed to a switch 104, along with a signal 106 indicating whether or not $N_1$ has failed (i.e. is unavailable or unreliable).

If the signal 106 indicates $N_1$ is good, the output 108 of the switch 104 will simply be the current calculated difference between $N_1$ and $N_{1syn}$. If the signal 106 indicates $N_1$ is not good, the output 108 will be the value of the signal 110, which is the last value of the difference between $N_1$ and $N_{1syn}$ calculated before the failure signal was received by the switch. In either event, the switch output 108 is sent to a subtractor 112, along with the $N_{1syn}$ signal 99, and the output signal 114 therefrom is sent to the switch 116, along with the signal 44 indicative of the actual measured value of $N_1$.

The fault signal 106 is delivered to the switch 116. If the signal 106 indicates $N_1$ is still good, then the $N_1$ signal 44 is passed therethrough as the switch output signal 118. If $N_1$ is bad, the signal 118 will have the value of the signal 114, which is n estimated value of $N_1$.

In accordance with the present invention, it can be seen that at the instant of $N_1$ failure (i.e. upon switchover to the use of $N_{1syn}$) the value of the output 114, and thus the value of the signal 118, will be the last good value of $N_1$ measured essentially at the instant before failure. Thereafter, the value of output 114 will increase and decrease incrementally by an amount equal to the change in the calculated value of $N_{1syn}$. Thus, the control produces no bump at the instant of switchover and continues to control the engine smoothly as a function of $N_{1syn}$.

It should be apparent that the foregoing method for eliminating a bump upon switchover from actual engine speed to synthesized engine speed may be used to eliminate a bump in switching from the use of any measured parameter to the use of a synthesized value of that parameter.

Additionally, it should be understood by those skilled in the art that other various changes and omissions in the form and detail of the invention may be made without departing from the spirit and scope thereof.

We claim:

1. In the method of operation of a control system for a gas turbine engine, which system uses the actual value of a parameter in its operation and continuously calculates a synthesized value of that parameter for use in the event of loss of the actual value of the parameter, the steps of:

continuously calculating a trim value as the difference between the synthesized and actual value of the parameter;

upon loss of the actual value of the parameter, fixing the value of the trim at the value last calculated before loss;

applying the fixed trim value to the synthesized value of the parameter continuously after loss of the actual value of the parameter; and using, after loss of the actual value of the parameter, the trimmed synthesized value of the parameter in place of the actual value of the parameter.

2. The method of operation according to claim 1 wherein the trimmed synthesized value of the parameter first used by the control system upon loss of the actual value of the parameter is the last known actual value of the parameter before loss.

3. The method of operation according to claim 1, wherein the parameter is engine speed, and the trimmed synthesized value of the engine speed first used upon loss of actual value of engine speed is the last known actual value of engine speed before loss.

4. In a control system for a gas turbine engine having a compressor, a burner, a turbine, and means for continuously measuring the actual value of a parameter, said control system including means for regulating the engine using the actual value of the parameter and means for continuously calculating a synthesized value of the parameter for use in the event of loss of the actual value of the parameter, the improvement comprising:

means for continuously calculating a trim value as the difference between the synthesized and actual value of the parameter;

means for generating a failure signal when the actual value of the parameter cannot be reliably determined;

means for receiving the failure signal and for fixing the value of the trim at the value last calculated by said trim calculating means prior to receiving the failure signal;

means for applying the fixed trim value to the synthesized value of the parameter continuously after receiving the failure signal; and means for using the trimmed synthesized value of the parameter in place of the actual value of the parameter to regulate the engine after receiving the failure signal.

5. The improved control system according the claim 4 wherein the parameter is compressor speed.

* * * * *